(12) United States Patent
Gorday

(10) Patent No.: US 8,135,094 B2
(45) Date of Patent: Mar. 13, 2012

(54) RECEIVER I/Q GROUP DELAY MISMATCH CORRECTION

(75) Inventor: Robert Mark Gorday, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 790 days.

(21) Appl. No.: 12/199,089

(22) Filed: Aug. 27, 2008

(65) Prior Publication Data

US 2010/0054367 A1    Mar. 4, 2010

(51) Int. Cl.
*H04L 27/22* (2006.01)
*H03H 7/30* (2006.01)
*H03D 3/00* (2006.01)

(52) U.S. Cl. .................. 375/332; 375/235; 329/304

(58) Field of Classification Search ............ 375/235, 375/281, 324, 332, 340, 350; 329/304, 305, 329/310
See application file for complete search history.

(56) References Cited

U.S. PATENT DOCUMENTS

| | | | |
|---|---|---|---|
| 6,330,290 B1 | 12/2001 | Glas | |
| 6,442,217 B1 | 8/2002 | Cochran | |
| 6,785,529 B2 | 8/2004 | Ciccarelli et al. | |
| 6,925,132 B2 | 8/2005 | Song et al. | |
| 7,010,059 B2 | 3/2006 | Song et al. | |
| 7,020,220 B2 | 3/2006 | Hansen | |
| 7,035,341 B2 | 4/2006 | Mohindra | |
| 7,130,359 B2 | 10/2006 | Rahman | |
| 7,158,586 B2 | 1/2007 | Husted | |
| 7,184,740 B2 | 2/2007 | Kim | |
| 7,187,725 B2 | 3/2007 | Song et al. | |
| 7,248,654 B2 | 7/2007 | Song et al. | |
| 7,310,388 B2 | 12/2007 | Koskela et al. | |
| 7,376,170 B2 | 5/2008 | Scheck | |
| 7,515,650 B1 * | 4/2009 | Warner et al. ............... 375/302 |
| 2005/0008107 A1 | 1/2005 | Brown | |
| 2005/0243949 A1 | 11/2005 | Khoini-Poorfard | |
| 2005/0260949 A1 | 11/2005 | Kiss et al. | |
| 2006/0291590 A1 | 12/2006 | Elahi et al. | |
| 2007/0058755 A1 | 3/2007 | Husted | |
| 2007/0080835 A1 * | 4/2007 | Maeda et al. ............... 341/120 |
| 2007/0099570 A1 | 5/2007 | Gao et al. | |
| 2007/0104291 A1 | 5/2007 | Yoon | |
| 2007/0291883 A1 * | 12/2007 | Welz et al. ................. 375/350 |
| 2009/0046011 A1 * | 2/2009 | Tung et al. ................. 342/377 |

FOREIGN PATENT DOCUMENTS

WO    WO 2004/082232 A1    9/2004

* cited by examiner

Primary Examiner — Young T. Tse

(57) ABSTRACT

A device for minimizing group delay mismatch in a quadrature receiver (402) having an in-phase channel and a quadrature-phase channel. The device includes a microprocessor (465) for determining an I/Q phase imbalance between digital signals on an in-phase channel and digital signals on a quadrature-phase channel, and for calculating a group delay mismatch between the in-phase channel and the quadrature-phase channel, and a group delay equalizer (426). The group delay equalizer includes a delay line (505 and 605) for delaying one of the in-phase channel and the quadrature-phase channel by one of a plurality of delays, based on an amount of group delay mismatch.

10 Claims, 8 Drawing Sheets

RECEIVER I/Q GROUP DELAY MISMATCH CORRECTION

BACKGROUND OF THE INVENTION

1. Field of the Invention

This invention relates generally to radio frequency receivers, and more specifically to balancing amplitude and phase of an in-phase signal with amplitude and phase of a quadrature-phase signal in a quadrature receiver.

2. Related Art

In a low-IF receiver, the baseband I-channel and Q-channel may have unequal group delays, which is typically caused by small differences in path length and/or caused by one or more mismatches between I-channel and Q-channel analog filters and/or caused by one or more mismatches between I-channel and Q-channel mixers. Any difference in path length between the I-channel and the Q-channel produces a phase versus frequency response that is linear. Any mismatch between I-channel and Q-channel analog filters produces a phase versus frequency response that is non-linear, i.e., varies with frequency over a bandwidth of a received signal. Any mismatch between I-channel and Q-channel mixers produces a phase versus frequency response that is also non-linear. In a low-IF receiver, any imbalance between an in-phase (I) signal and a quadrature-phase (Q) signal should be minimized to provide good image rejection. I/Q group delay mismatch is usually minimized by careful design of I/Q paths. However, in some known low-IF receivers, as many as seven (7) radio frequency (RF) bands are routed to the baseband portion of the receiver, which makes it more difficult to control the I/Q group delay in such receivers.

Known low-IF receivers employ I/Q amplitude and phase correction that comprises a two-step process consisting of a calibration step followed by a correction step. One known low-IF receiver provides a phase imbalance correction that is linear, but, disadvantageously, the phase imbalance correction does not vary with frequency. Therefore, the existing phase imbalance correction is band-limited to a region near a single calibration frequency, thereby disadvantageously reducing image rejection for a wideband interferer.

FIG. 1 is a simplified functional block diagram of a prior art receiver 102 including a prior art I/Q equalization circuit 135. The receiver 102 includes analog circuits 104 and digital circuits 106. The analog circuits 104 include an antenna 108 for receiving a digitally-modulated, non-spread-spectrum signal, and a low noise amplifier (LNA) 110. The LNA 110 is coupled to mixers 114 and 115. A local oscillator (LO) 112 is coupled to mixer 114 to produce an in-phase channel, or I-channel, signal. The local oscillator (LO) 112 is also coupled to mixer 115, via a 90° phase shifter 113, to produce a quadrature-phase channel, or Q-channel, signal. The pair of mixers 114 and 115 produces a phase and amplitude imbalance that is constant over the signal bandwidth. The analog circuits 104 include I-channel and Q-channel lowpass analog filters 116 and 117, analog amplifiers 118 and 119, and analog-to-digital (A/D) converters 122 and 123. The analog filters 116 and 118 produce a phase and amplitude imbalance that varies over the signal bandwidth. The digital circuits 106 include a downsampling filter 130 and 131 that is coupled to an output of the A/D converter 122 and 123 via a 5-bit wide data path 125. A prior art I/Q equalization circuit 135 is coupled to an output of the Q-channel downsampling filter 131 via a 15-bit wide data path 133. The prior art I/Q equalization circuit 135 has a real output 138 and an imaginary output 139. The real output 138 from the prior art equalization circuit 135 is added to an output 132 from the I-channel downsampling filter 130 at adder 142. An output from the adder 142 is coupled to an I-channel selectivity filter 146. The imaginary output 139 from the prior art I/Q equalization circuit 135 is coupled to a Q-channel selectivity filter 147. The outputs from the selectivity filters 146 and 147 are coupled to a demodulator signal processor 150.

FIG. 2 is a simplified functional block diagram of one known prior art I/Q equalization circuit 135. The equalization circuit 135 corrects for the frequency-independent phase imbalance due to mixer imbalance, for the frequency-dependent phase imbalance due to path length differences and for the frequency-dependent phase imbalance due to analog filter mismatch. Most of the frequency-dependent phase imbalance is caused by the analog filters 116 and 117. The I/Q equalization circuit of FIG. 2 uses a complex finite impulse response (FIR) filter 202 on the Q-channel path. The FIR filter 202 includes a set of delay elements 204, a set of complex multipliers 208 and a set of complex adders 212. In the prior art, the detection of group delay is accomplished by measuring the phase imbalance versus frequency response at several test frequencies. The pairs of phase imbalance/test frequency data are inputted into a set of equations that produce complex coefficients for the FIR filter 202. With prior art receivers, including the prior art receiver 102, a set of linear equations is required to convert measured phase imbalance values into FIR coefficients. In general, for a set of N complex coefficients, N pairs of $(f_N, \text{phase\_imbalance}(f_N))$ are measured, and a set of linear equations (i.e., N-equations, N-unknowns) is solved. Disadvantageously, the complex finite impulse response (FIR) filter 202 uses complex coefficients ($C_0$, $C_1$, $C_2$, ..., $C_{N-1}$), and therefore requires two multiplications (one for the coefficient real part, and one for the coefficient imaginary part), and the complex additions require real and imaginary additions.

FIG. 3 is a simplified functional block diagram of another known prior art I/Q equalization circuit 135, in which a complex FIR filter 301 is separated into two parts: a real FIR filter 303 followed by a complex multiplier 305 that has a single complex coefficient $C_0$. The real FIR filter 303 includes a set of delay elements 304, a set of real multipliers 308 and a set of real adders 312. A real-valued output 316 from the real FIR filter 303 is fed into the complex multiplier 305. This simplification can be made only when the frequency-dependent phase imbalance has odd symmetry about f=0 Hz, which is usually the case. In a low-IF architecture, the complex multiplier 305 is often combined with a down-mixing operation (not shown).

Referring now to FIGS. 2 and 3, the equalization circuit 135 includes delay elements 204 and 304, multipliers 208 and 308, adders 212 and 312, and memory (not shown), all of which disadvantageously operate on relatively wide 15-bit data.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION OF THE EXEMPLARY EMBODIMENT

Figure 4:
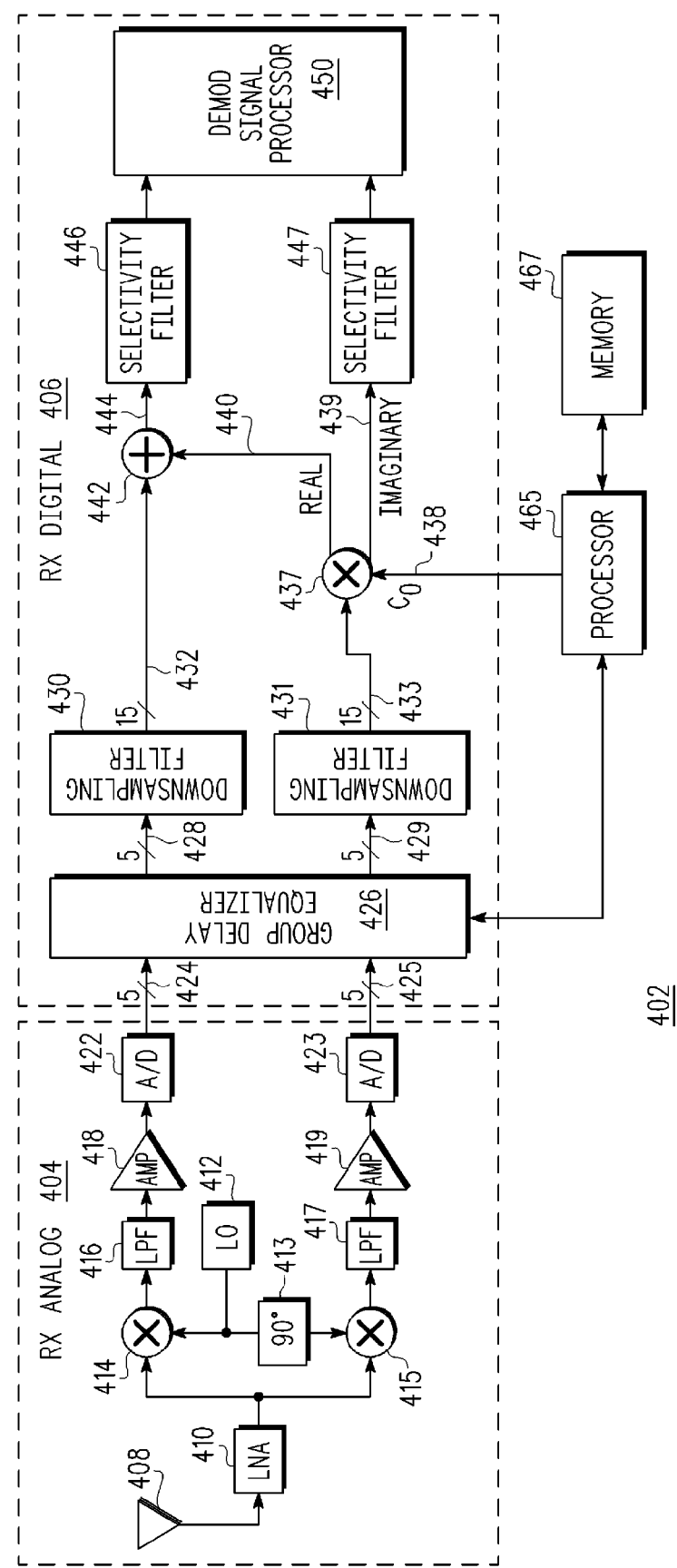
FIG. 4 is a simplified functional block diagram of a receiver in accordance with an embodiment of the invention, including a group delay equalizer circuit.

FIG. 4 is a simplified functional block diagram of a low-IF, or near zero-IF, receiver 402 in accordance with one embodiment of the invention. The receiver 402 includes analog circuits 404 and digital circuits 406. The analog circuits 404 include an antenna 408 for receiving a digitally-modulated signal, non-spread-spectrum signal, and a low noise amplifier (LNA) 410. The LNA 410 is coupled to mixers 414 and 415. A local oscillator (LO) 412 is coupled to the mixer 414 to produce an in-phase channel, or I-channel, signal. The LO 412 is also coupled to the mixer 415, via a 90° phase shifter 413, to produce a quadrature-phase channel, or Q-channel, signal. The analog mixers 414 and 415 produce a phase and amplitude imbalance that is approximately constant over the signal bandwidth. The analog circuits 404 include I-channel and Q-channel lowpass analog filters 416 and 417, analog amplifiers 418 and 419, and analog-to-digital (A/D) converters 422 and 423. The analog filters 416 and 417 produce a phase and amplitude imbalance that varies over the signal bandwidth. The digital circuits 406 include a variable group delay equalizer 426 that is coupled to an output of each A/D converter 422 and 423 via a 5-bit wide data path 424 and 425. Downsampling filters 430 and 431 are coupled to outputs of the group delay equalizer 426 via 5-bit wide data paths 428 and 429. The downsampling filters 430 and 431 include anti-aliasing lowpass filters, and change the sampling rate from $Fs_{A/D}$ to $Fs_{A/D}/48$, where $Fs_{A/D}$ is the sampling rate of the analog-to-digital converter in samples per second. A single-tap complex multiplier 437 is coupled to an output of the Q-channel downsampling filter 431 via a 15-bit wide data path 433. The complex multiplier 437 has an imaginary output 439 and a real output 440. The real output 440 from the complex multiplier 437 is added to an output 432 from the I-channel downsampling filter 430 at adder 442. A signal at the output 432 of the I-channel downsampling filter 430 is a discrete time-varying signal x(n), and a signal at the output 433 of the Q-channel downsampling filter 431 is a discrete time-varying signal y(n), where n is the discrete time index (i.e., n=0, 1, 2, . . . ). The signal y(n) is fed into an input 433 of the complex multiplier 437. The signal at the output of the complex multiplier 437 is the signal at its input 433 multiplied by a complex number $C_0$. Therefore, if $C_0 = C_{0\_real} + j*C_{0\_imag}$, then the imaginary output 439 is $y(n)*C_{0\_imag}$ and the real output 440 is $y(n)*C_{0\_real}$. Consequently, the output 444 of the adder 442 is $x(n)+y(n)*C_{0\_real}$. The output 444 from the adder 442 is coupled to an I-channel selectivity filter 446. The imaginary output 439 of the complex multiplier 437 is coupled to a Q-channel selectivity filter 447. The outputs from the selectivity filters 446 and 447 are coupled to a demodulator signal processor 450. In an exemplary embodiment, the receiver 402 operates with a Global System for Mobile communications (GSM) protocol. A microprocessor 465, which executes appropriate software instructions, resides on a same integrated circuit (not shown) as the receiver 402, and is coupled to memory 467.

The receiver 402 includes I/Q auto-calibration hardware and software for measuring I/Q amplitude and phase imbalance. In the receiver 402, the baseband I-channel and Q-channel may have unequal group delays at the input (see 5-bit wide data paths 424 and 425) of the group delay equalizer 426. To correct for any such unequal group delays, a variable group delay is implemented by the group delay equalizer 426 as a programmable number of A/D samples in order to delay the digital signal on one of the I-channel and the Q-channel. From Fourier transform theory, a constant delay $T_{DELAY}$ in the time-domain creates a frequency-domain phase shift that varies linearly as a function of frequency, i.e., $-2\pi T_{DELAY}*f$, where f is an independent variable for frequency. Because the group delay equalizer 426 does not provide any signal attenuation versus frequency, it can be referred to as an all-pass filter.

The complex multiplier 437 corrects for the frequency-independent mixer imbalances. The complex multiplier 437 includes a real-input, complex-output multiplication. The real-input is the received Q-channel. The complex multiplier 437 includes a tap 438. A complex correction value $C_0$ is inputted into the complex multiplier 437 at the tap 438. The complex correction value $C_0$ is a constant. The complex correction value $C_0$ is computed as follows. First, inject into the receiver 402 an unmodulated test sinusoid at RF frequency $f_{Rx\_m}$ (so that $\pm f_{CAL}$ are the resulting baseband frequencies). Second, measure the amplitude and phase of the unmodulated test sinusoid on both the I-channel and the Q-channel relative to a common reference sinusoid, which is typically done by correlating the unmodulated test sinusoid with the common reference sinusoid. A typical implementation includes performing a single-bin discrete Fourier transform on both the I-channel and the Q-channel. The results are two complex values, $I_{CAL}$ and $Q_{CAL}$. Third, compute the complex correction value $C_0$ as follows:

$$C_0 = \text{conjugate}\{-j*I_{CAL}/Q_{CAL}\}.$$

Phase imbalance is defined as phase angle(Q)/phase angle (I). By delaying only the I-channel or only the Q-channel, a linearly varying phase imbalance is created between the I-channel and the Q-channel. Delaying the I-channel introduces a positive phase imbalance slope versus frequency, and delaying the Q-channel introduces a negative slope phase imbalance versus frequency. The group delay equalizer 426 is programmable to cancel a phase imbalance versus frequency of the response of the analog circuits 404 of the receiver 402. This can be pictured as changing a slope of a graph of a phase imbalance versus frequency of the response of the analog circuits 404 of the receiver 402 so that the slope is closer to zero, as more fully explained hereinbelow. Only one channel needs to be delayed. The slope of the phase imbalance increases linearly with delay as $2*\pi*T_{sample}*k$, where $T_{sample}$ is the time duration of a sample at the output (see 5-bit wide data path 424 and 425) of the A/D converter 422 and 423, respectively, and k is the number of delays. An exemplary value for $T_{sample}$ is:

$$T_{sample} = 1/(\text{the sampling rate of the A/D converter}) = 1/(104 \text{ MHz}) = 9.6154 \text{ nsec.}$$

Figure 1:
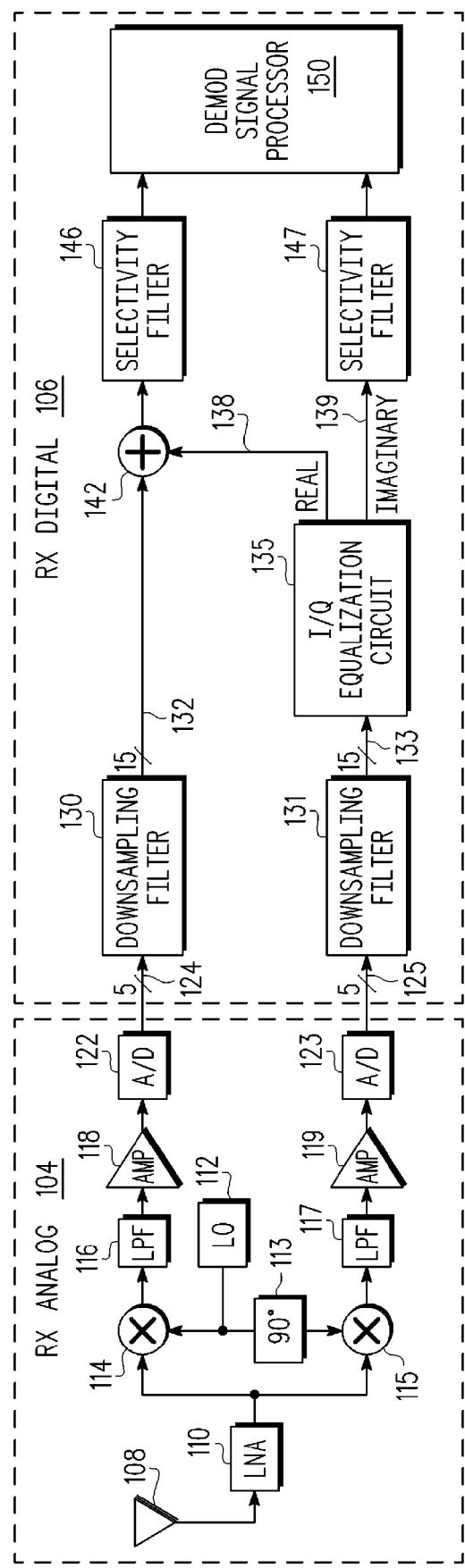
FIG. 1 is a simplified functional block diagram of a prior art receiver, including a prior art I/Q equalization circuit.
Figure 2:
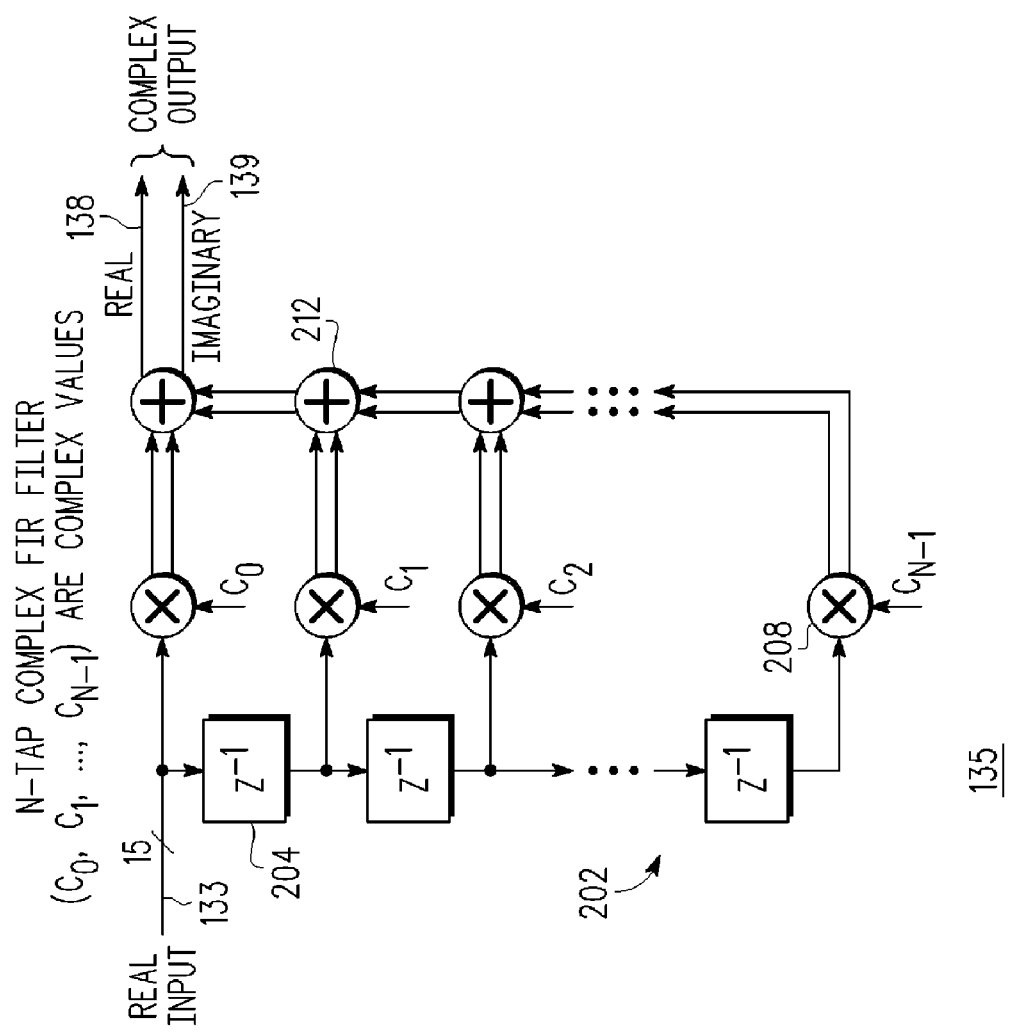
FIG. 2 is a simplified functional block diagram of a known prior art I/Q equalization circuit.
Figure 3:
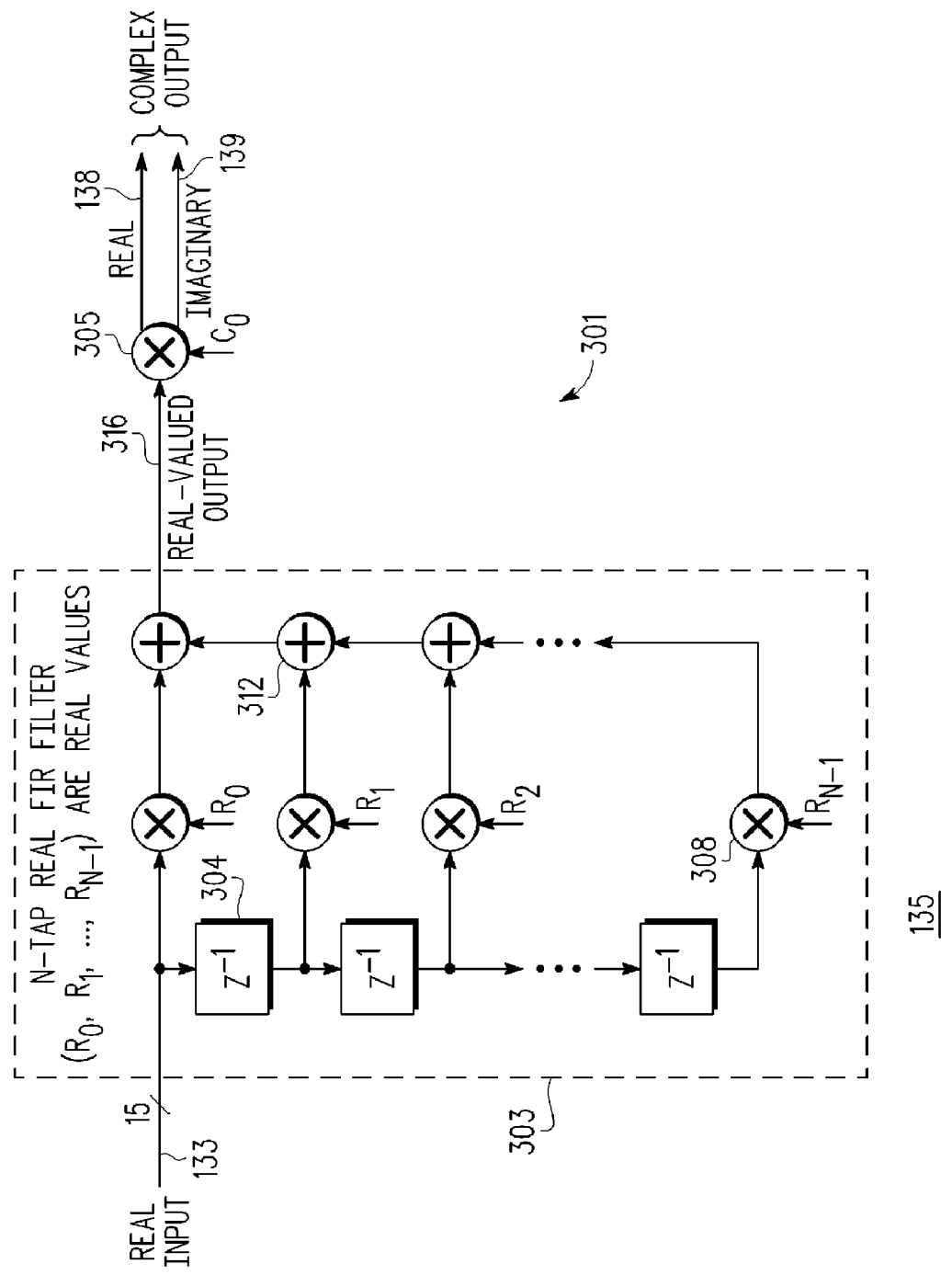
FIG. 3 is a simplified functional block diagram of another known prior art I/Q equalization circuit.

In the receiver 402, the group delay equalizer 426, located upstream from the downsampling filter 431 (see FIG. 4), replaces a real-valued FIR filter 303 located downstream from the downsampling filter 131 in the prior art receiver 102 (see FIG. 1). However, the group delay equalizer 426 of the receiver 402 is, advantageously, not equivalent to the prior art real-valued FIR filter 303 of the prior art receiver 102; rather, it is a simplification of the prior art real-valued FIR filter. The prior art real-valued FIR filter 303 is computed to have a non-linear phase versus frequency response to match the measured non-linear phase imbalance versus frequency response at the output of the analog portion 104 of the prior art receiver 102. On the other hand, the group delay equalizer 426 of the receiver 402 advantageously uses only delay lines 505 and 605 without a FIR filter. Therefore, the group delay equalizer 426 of the receiver 402 produces a linear group delay mismatch versus frequency response to approximately counteract the non-linear group delay mismatch versus frequency response at the output of the analog portion 404 of the receiver 402.

Figure 5:
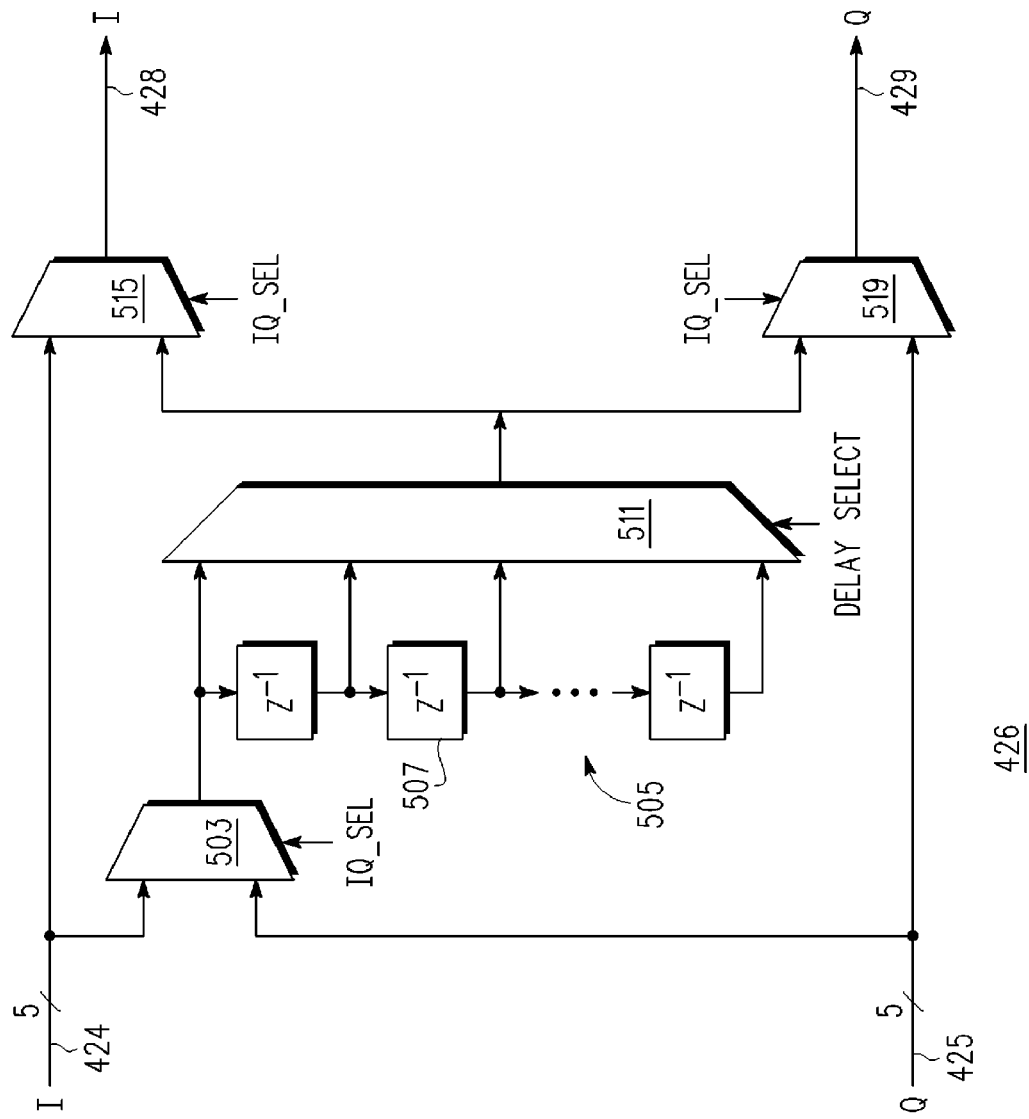
FIG. 5 is a simplified functional block diagram of an embodiment of the group delay equalizer circuit of FIG. 4.

FIG. 5 is a simplified functional block diagram of an embodiment of the group delay equalizer 426. The group delay equalizer 426 includes a multiplexer 503 that is programmable to select a digital signal from one of the I-channel and the Q-channel. A value of an IQ_SEL signal controls an output of the multiplexer 503. The output of the multiplexer 503 is coupled to a delay line 505, or series of delay elements 507, and to another multiplexer 511. The output of each delay element 507 is coupled to an input of the other multiplexer 511 and to a next delay element in the delay line 505. A value of a DELAY_SEL signal determines an amount of delay, k, including possibly no delay, present at an output of the other multiplexer 511. The output of the multiplexer 511 is fed into a multiplexer 515 on the I-channel and a multiplexer 519 on the Q-channel. The value of the IQ_SEL signal also controls an output of each multiplexer 515 and 519. The group delay equalizer 426 delays one of the I-channel signal and the Q-channel signal, and the amount of delay, k, is selectable. The receiver 402 provides a power and area savings compared with prior art receivers such as prior art receiver 102 because the prior art receiver 102 includes delay elements, multipliers, adders and memory that operate on 15-bit data that is outputted by the downsampling filter 130 and 131. On the other hand, the group delay equalizer 426 of the receiver 402 includes the delay line 505 for relatively narrow 5-bit data and includes other circuits that operate on relatively narrow 5-bit data prior to the received signal entering the downsampling filter 430 and 431.

Figure 6:
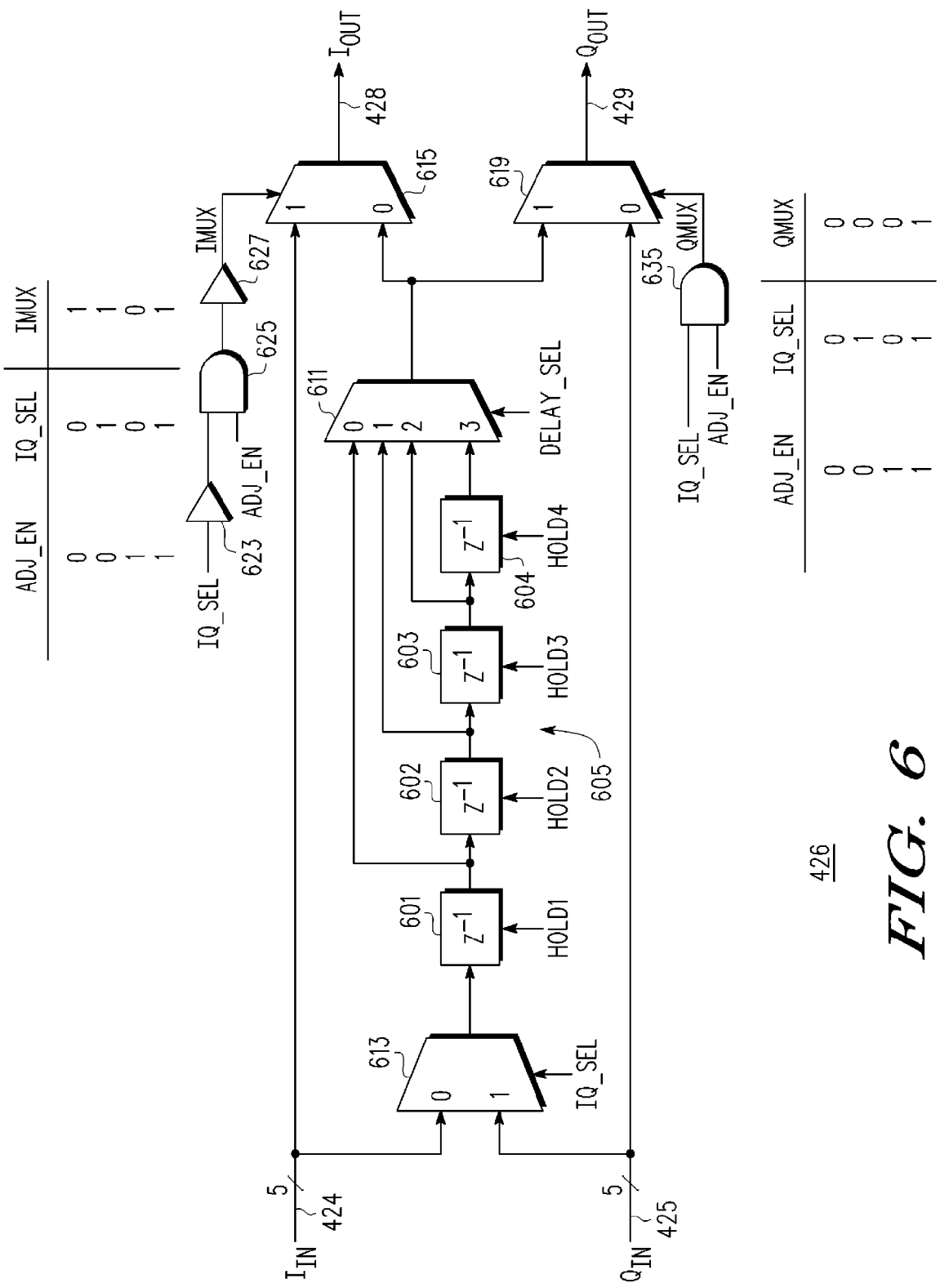
FIG. 6 is a simplified functional block diagram of another embodiment of the group delay equalizer circuit of FIG. 4.

FIG. 6 is a simplified functional block diagram of another embodiment of the group delay equalizer 426. FIG. 6 shows how control parameters (ADJ_EN, IQ_SEL and DELAY_SEL) are used to configure the controllable delay. The in-phase channel and the quadrature phase channel are fed into inputs of a multiplexer 613, and the IQ_SEL signal is fed into the control input of the multiplexer 613. The output of the multiplexer 613 is fed into a delay line 605 that includes, in an exemplary embodiment, four (4) delay elements 601-604. Outputs from the delay line 605 are fed into inputs of a multiplexer 611, and the DELAY_SEL signal is fed into a control input of a multiplexer 611. The output of the multiplexer 611 is fed into an input of multiplexers 615 and 619, and the in-phase channel and the quadrature phase channel are fed into other inputs of the multiplexers 615 and 619. The IQ_SEL signal is fed into an inverter 623, whose output is fed into an AND gate 625 with the ADJ_EN signal. The output of the AND gate 625 is inverted by inverter 627 and is fed into a control input of a multiplexer 615. Separately, the IQ_SEL signal is fed into an AND gate 635 with the ADJ_EN signal. The output of the AND gate 635 is fed into a control input of a multiplexer 619. When IQ_SEL=1, the quadrature-phase channel at the output of the multiplexer 619 is delayed, and the in-phase channel at the output of multiplexer 615 is not delayed. When IQ_SEL=0, the in-phase channel at the output of multiplexer 615 is delayed, and the quadrature-phase channel at the output of multiplexer 619 is not delayed. Further power savings can be accomplished by the HOLD1 through HOLD4 signals, which are used to disable the un-used delay elements 601-604 in the delay line 605. The control parameters and the HOLD1 through HOLD4 signals are received from the microprocessor 465.

Figure 7:
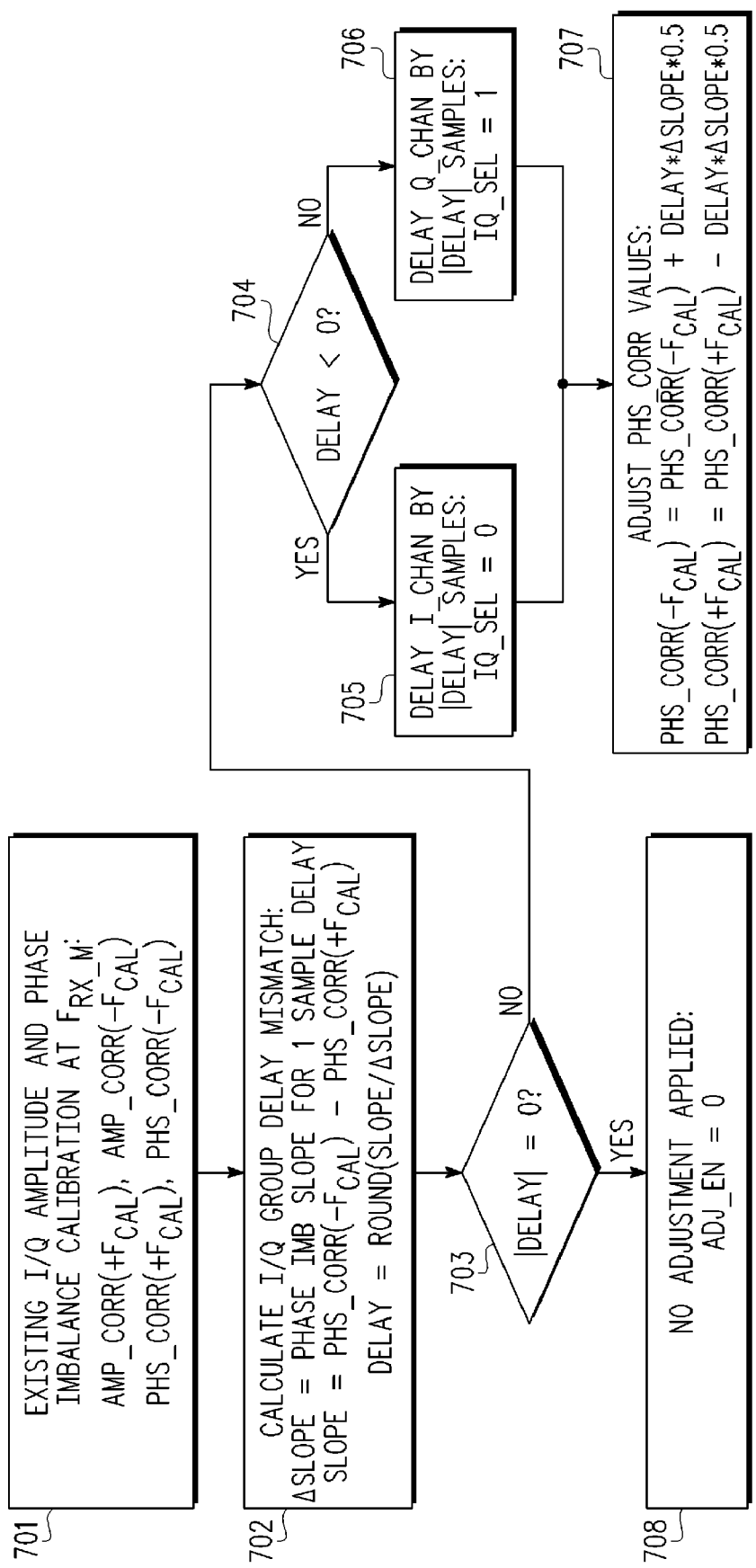
FIG. 7 is a flow diagram illustrating a method in accordance with an embodiment of the invention.

FIG. 7 is a flow diagram 700 illustrating a method in accordance with an embodiment of the invention. A method for I/Q group delay mismatch calibration and correction includes a calibration phase that uses phase imbalance at two baseband frequencies to estimate group delay mismatch, followed by a correction phase uses a variable delay to the I-channel or the Q-channel. For GSM applications, the receiver 402 includes a plurality of mixer/local oscillator circuits, each tuned to one of m RF bands.

The method starts at step 701 in which the amount of I/Q amplitude and phase imbalance is determined at receive frequency $f_{Rx\_m}$, where m indicates an $m^{th}$ RF band. The frequency $f_{Rx\_m}$ refers to the RF frequency of a calibration tone. A baseband calibration frequency, after the RF signal of the calibration tone has been downconverted by the mixer 414 and 415, is defined as $f_{CAL}$. In an exemplary embodiment, $f_{CAL}$=220 kHz. Therefore, the 220 kHz frequency is the calibration tone after the mixer, and $f_{Rx\_m}$ is the calibration frequency before the mixer. A difference between the RF frequency of the calibration tone and the oscillator frequency is $f_{Rx\_m}-f_{osc}=\pm 220$ kHz. Assuming $f_{osc}$ is the frequency of the LO 412 injected into the mixer 414 and 415, when $f_{osc}<f_{Rx\_m}$, the calibration tone $f_{CAL}$ would be +220 kHz (referred to as low side injection). When $f_{osc}>f_{Rx\_m}$ (referred to as high side injection), the calibration tone $f_{CAL}$ would be −220 kHz after the mixer. In order to optimize I/Q correction, I/Q imbalance and group delay correction parameters are computed for each of the m RF bands. For each of the $f_{Rx\_m}$ RF frequencies tested, the frequency of the LO 412 is adjusted to maintain $f_{Rx\_m}-f_{osc}=\pm 220$ kHz. Multiple RF frequencies are tested, because the RF circuit impedances (e.g., mixer and oscillator) vary across the m bands of operation of the receiver 402. An unmodulated calibration sinusoidal at $f_{CAL}$ is created at a desired frequency and power. The frequency and power are defined to mimic a specific interferer scenario that is the defining scenario for I/Q imbalance. For example, for a GSM, low-IF architecture, an exemplary calibration frequency is set at 220 kHz, and the input level is −41 dBm into the receiver 402, which is where the interferer would be for the specified alternate channel rejection test of the 3rd Generation Partnership Project (3GPP). The group delay is detected using phase imbalance measurements at $+f_{CAL}$ and $-f_{CAL}$, where $f_{CAL}$ is a calibration frequency. For GSM, the exemplary frequency is $f_{CAL}$=220 kHz, therefore $-f_{CAL}$=−220 kHz. The alternate channel interferer for GSM is located at 220 kHz; therefore, this exemplary frequency is protocol specific. The phase imbalance slope from $-f_{CAL}$ to $+f_{CAL}$ is measured and compared to the slopes that would be achieved by delaying the I-channel or the Q-channel by 0, 1, 2, . . . samples. The number of samples of delay that produces a slope closest to the measured slope and opposite in sign is chosen for equalization. At step 701, the values of two phase correction calibration data, phs_corr($+f_{CAL}$) and phs_corr($-f_{CAL}$), are determined, and the values of two amplitude correction calibration data, amp_corr($+f_{CAL}$) and amp_corr($-f_{CAL}$), are determined.

The method then proceeds to step 702, in which the phase correction calibration data, phs_corr($+f_{CAL}$) and phs_corr($-f_{CAL}$), are used to calculate the I/Q group delay mismatch. It should be noted that phs_imb($+f_{CAL}$) is the negative of phs_corr($+f_{CAL}$) because phs_corr($+f_{CAL}$) is selected to counteract phs_imb($+f_{CAL}$). For a similar reason, phs_imb($-f_{CAL}$)

is the negative of phs_corr($-f_{CAL}$). The I/Q group delay mismatch, grp_del_mm, is a linear estimation of the slope of phase imbalance versus frequency, which is calculated as the change in slope divided by the change in frequency over the range $-f_{CAL}$ to $+f_{CAL}$.

grp_del_mm=(phs_imb($-f_{CAL}$)−phs_imb($+f_{CAL}$))/
(4*π*$f_{CAL}$), in units of seconds Software uses phase calibration data at two baseband frequencies, $-f_{CAL}$ and $+f_{CAL}$, to compute group delay mismatch. A one-sample time delay equals $z^{-1}$ at the sampling rate of the A/D converter 422 and 423.

Δslope=slope of phase imbalance for one sample
delay, measured from $-f_{CAL}$ to $+f_{CAL}$ Therefore, Δslope is the resolution of the group delay correction, because the delay can only occur in increments of one sample.

slope=phs_imb($-f_{CAL}$)−phs_imb($+f_{CAL}$)

The slope is divided by the resolution to determine the number of samples of delay needed.

delay=round(slope/Δslope)

The slope is rounded because the signal on one of the I-channel and the Q-channel can be delayed by only an integer numbers of samples. A choice is made between one of two group delay corrections when the measured phase imbalance is between the two group delay corrections. This is done by rounding the ratio of slope/Δslope in step 702. By rounding this ratio, the closest correction slope to the measured slope is determined. Step 702 computes the delay, which, in an exemplary embodiment, is one of 0, 1, 2, 3 and 4 samples.

The method then proceeds to step 703, in which a comparison of the absolute value of the delay to zero is made. If |delay|≠0, an adjustment will be applied in a subsequent step, i.e., ADJ_EN=1 (see FIG. 6), and the method proceeds to step 704. At step 704, a comparison of the value of the delay to zero is made. If the value of the delay is less than zero, the method proceeds to step 705, where the delay of the I-channel signal is set to the absolute value of the delay, i.e., IQ_SEL=0 and DELAY_SELECT=|delay|, thereby correcting for at least some of the group delay mismatch. If the value of the delay is not less than zero, the method proceeds to step 706, where the delay of the Q-channel signal is set to the absolute value of the delay, i.e., IQ_SEL=1 and DELAY_SELECT=|delay|, thereby correcting for at least some of the group delay mismatch.

After step 705 or 706, the method proceeds to step 707, where the initial phs_corr values are adjusted. Because group delay correction changes phase imbalance, the initial phs_corr values should be adjusted. The group delay calibration (see steps 704 and 705) compensates for the slope, and it ignores any mean value over the range $-f_{CAL}$ to $+f_{CAL}$. The complex multiplier 437 removes the mean value over this range. For example, assume, at step 701 it was determined that the phase imbalance at $-f_{CAL}$ is +3° and the phase imbalance at $+f_{CAL}$ is +5°. The group delay correction (see steps 704 and 705) performed by the group delay equalizer 426 selects the appropriate I-channel or Q-channel delay to flatten this slope of 2°. Assume that zero samples of delay corresponds to 0° of correction, one sample delay corresponds to 1.4° of correction, and two samples corresponds to 2.8° of correction, then the calibration selects one sample (because 1.4° is closer to the measured 2° slope). The group delay correction reduces the slope by effectively rotating the slope about the midpoint (at f=0, which is (5+3)/2=4°). Following the group delay correction, the new phase imbalance is 3+0.7=3.7° at $-f_{CAL}$ and 5−0.7=4.3° at $+f_{CAL}$. Therefore, the original phase imbalance values are changed by the selected group delay correction 821. Also, now there is a new imbalance at $-f_{CAL}$ and $+f_{CAL}$, that should be corrected with the $C_0$ coefficient. Advantageously, the residual slope of the I/Q group delay mismatch versus frequency becomes only 0.6°, which is as small as possible given the 1.4° assumed resolution.

Because the group delay correction corrects for only some of the measured phase imbalance, a final $C_0$ value needs to be calculated to correct for the part of phase imbalance not corrected by the group delay correction. This can be accomplished using one of two methods. A first method includes the steps of: a) measuring phase imbalance, b) calculating group delay mismatch, and c) subtracting group delay mismatch correction from phase imbalance to adjust the value of $C_0$. A second method includes the steps of: a) measuring phase imbalance, b) calculating group delay mismatch, c) re-measuring phase imbalance with group delay mismatch correction on, and d) calculating the value of $C_0$. The numerical example in the preceding paragraph follows the first method. In an exemplary embodiment, the first method is used because it requires only one measurement of phase imbalance. Using either method, the phs_corr values are adjusted as follows:

phs_corr($-f_{CAL}$)=phs_corr($-f_{CAL}$)+delay*Δslope*0.5 phs_corr($+f_{CAL}$)=phs_corr($+f_{CAL}$)−delay*Δslope*0.5

Referring again to step 703, if |delay|=0, the method proceeds to step 708, where no adjustment is applied, i.e., adj_en=0, (see FIG. 6). The calculations described herein are accomplished by the microprocessor 465.

Figure 8:
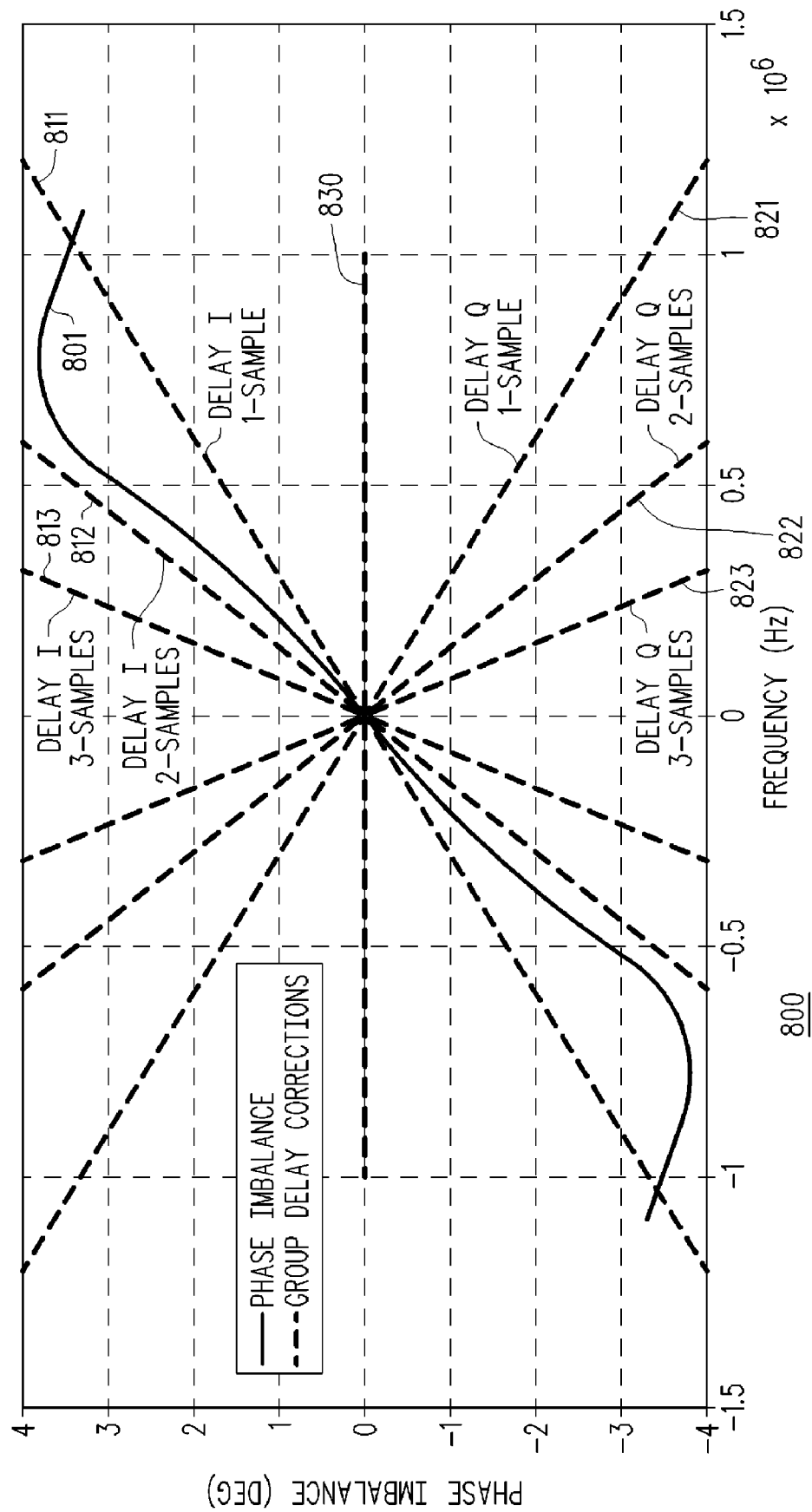
FIG. 8 is a chart of phase imbalance versus frequency.

FIG. 8 is a chart 800 of phase imbalance versus frequency. The chart 800 shows that the I/Q phase imbalance response 801 of the receiver 402 is frequency dependent, i.e., the amount of phase imbalance varies with frequency offset from the center frequency of the signal, and shows that the frequency imbalance response has odd symmetry. The I/Q phase imbalance response 801 of the receiver 402 is primarily caused by analog filter mismatch. Any phase imbalance response caused by an imbalance between the I-channel and Q-channel mixers, although non-linear, appears linear in the frequency range of interest. The chart 800 shows that the graph of the phase imbalance versus frequency is substantially linear within 0.5 MHz of the center frequency of the signal. The chart 800 shows a graph of three I-channel group delay corrections 811 to 813, representing delays of one, two and three samples, respectively, of the I-channel signal by the group delay equalizer 426. The chart 800 also shows a graph of three Q-channel group delay corrections 821 to 823, representing delays of one, two and three samples, respectively, of the Q-channel signal by the group delay equalizer 426. The chart 800 further shows a graph of a group delay mismatch correction 830 with no delay (slope=0), by which any phase imbalance is corrected using the single complex number $C_0$ at the complex multiplier 437. The group delay mismatch correction 830 with no delay is implemented when the I/Q phase imbalance is frequency independent, i.e., is linear, such as when the phase imbalance within a bandwidth of interest is caused solely by a difference in path length between the I-channel and the Q-channel, or by a mismatch between the mixers 414 and 415.

For example, assume the slope of the graph of measured phase imbalance (between the I-channel and the Q-channel) versus frequency is positive, as shown by phase imbalance response 801. This means that the Q-channel should be delayed because delaying the Q-channel introduces a negative slope phase imbalance versus frequency, as shown by the graph of each of the three Q-channel group delay corrections 821 to 823. In this example, the negative-slope phase imbalance introduced by the group delay equalizer 426 counteracts the positive-slope phase imbalance present at the input of the group delay equalizer 426. The method in accordance with the invention selects the one of the three or more Q-channel group delay corrections by which to delay the Q-channel. As a result, the slope of the graph of phase imbalance versus frequency at the output of the group delay equalizer 426 advantageously becomes closer to zero. In other words, the group delay equalizer 426 substantially corrects any group delay imbalance within the bandwidth of the received signal.

Because the sample rate of the A/D converter 422 and 423 is fixed, the group delay correction is quantized in steps of $T_{sample}$ seconds. Consequently, over the signal band of interest ($-F_0/2$ to $+F_0/2$), the slope of the phase imbalance is quantized in steps of $k*2*\pi*F_0*T_{sample}$. For the example shown FIG. 8, slopes of $k=\pm 0, \pm 1, \pm 2$ and $\pm 3$ are illustrated. In the exemplary embodiment, $$\Delta slope = 4\pi * f_{CAL} * T_{DELAY} = 4\pi * (220e3) * (1/104e6) = 0.0266 \text{ radians} = 1.523 \text{ degrees}$$

In empirical tests of the receiver 402, slopes as high as 4° were observed; therefore, in the exemplary embodiment, k is chosen to be as high as "4" to support a worst case of a 6° slope. The accuracy of the correction is reduced to half of the group delay step size. The worst case error of the correction is equal to half of the group delay step size.

For a GSM signal, which has a bandwidth of approximately ±0.5 MHz, the performance is adequate for this correction accuracy. In the example shown in FIG. 8, the best choice is to delay the Q-channel by two samples, as it is closest in value to the slope, and would have opposite sign slope to cancel the analog response of the receiver 402.

By correcting group delay mismatch, the phase imbalance versus frequency slope is flattened, i.e., the slope becomes less, which provides increased bandwidth of the phase imbalance correction algorithm and thereby improves image rejection of wideband signals.

Software for a warm-up procedure for the receiver 402 includes control parameters for hardware control parameters are saved in a software table versus RF band. A different set of control parameters is stored in the memory 467 for each of the m different RF bands.

The methods described hereinabove can be implemented by the microprocessor 465, or can be implemented in hardware, or can be implemented various combinations of each.

It should be understood that all circuitry described herein may be implemented either in silicon or another semiconductor material or alternatively by software code representation of silicon or another semiconductor material.

Although the invention is described herein with reference to specific embodiments, various modifications and changes can be made without departing from the scope of the present invention as set forth in the claims below. Although the exemplary embodiment of the receiver 402 is a low-IF, or near zero-IF, receiver, the invention is also applicable to a direct conversion, or zero-IF, receiver. Although the exemplary embodiment of the receiver 402 operates between approximately 800 MHz to approximately 2 GHz, the invention is applicable with a receiver that operates at other frequency bands. Although the exemplary embodiment is for use in a system that uses the GSM protocol, the invention could also be used in a system that uses one of various other protocols.

Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A quadrature receiver, comprising:
   an analog portion for receiving a radio frequency signal, the analog portion including
      an in-phase channel including an analog-to-digital converter for outputting an in-phase digital signal including discrete samples of the in-phase digital signal, and
      a quadrature-phase channel including an analog-to-digital converter for outputting a quadrature-phase digital signal including discrete samples of the quadrature-phase digital signal; and
   a digital portion, coupled to the analog portion, the digital portion including
      a group delay equalizer for receiving the in-phase digital signal and the quadrature-phase digital signal from the analog portion, wherein the group delay equalizer delays one of the in-phase and quadrature-phase digital signals by one or more samples based upon an amount of a group delay mismatch, the group delay equalizer producing a linear group delay mismatch versus frequency response to approximately counteract a non-linear group delay mismatch versus frequency response at an output of the analog portion, the group delay equalizer having an in-phase output and a quadrature-phase output, and
      circuitry for determining a phase imbalance between the in-phase channel and the quadrature-phase channel of the received radio frequency signal at a calibration frequency, the circuitry for determining including
         a processor for producing a complex number whose value is based on the amount of the phase imbalance,
         an I-channel downsampling filter,
         a Q-channel downsampling filter,
         a single-tap complex multiplier, coupled to an output of the Q-channel downsampling filter, for multiplying the output of the Q-channel downsampling filter with the complex number, the single-tap complex multiplier having a real output, and
         an adder for adding the real output of the single-tap complex multiplier to an output of the I-channel oversampling filter to reduce the phase imbalance between the in-phase channel and the quadrature-phase channel of the received radio frequency signal.

2. A device for minimizing group delay mismatch in a quadrature receiver having an in-phase channel and a quadrature-phase channel, the device comprising:
   a processor, coupled to the quadrature receiver, for determining an I/Q phase imbalance between digital signals of the in-phase channel and the digital signals of the quadrature-phase channel, and for calculating, from the phase imbalance, the group delay mismatch between the in-phase channel and the quadrature-phase channel; and a group delay equalizer, coupled to the processor, including:
a first multiplexer having an input coupled to the in-phase channel and another input coupled to the quadrature-phase channel of the quadrature receiver, a first control input coupled to the processor, and a first multiplexer output,
a delay line, coupled to the first multiplexer output of the first multiplexer, for delaying one of the in-phase channel and the quadrature-phase channel by one of a plurality of delays,
a second multiplexer having a plurality of inputs coupled to the delay line, a second control input coupled to the processor, and a second multiplexer output,
a third multiplexer having an input coupled to the in-phase channel and another input coupled to the second multiplexer output, a third control input coupled to the processor, and a third multiplexer output, and
a fourth multiplexer having an input coupled to the quadrature-phase channel and another input coupled to the second multiplexer output, a fourth control input coupled to the processor, and a fourth multiplexer output.

3. The device of claim 2, further including a multiplier for multiplying the fourth multiplexer output with a complex number having a value selected to reduce the phase imbalance between the in-phase channel and the quadrature-phase channel of the quadrature receiver, the multiplier having a real output and an imaginary output.

4. The device of claim 3, wherein the value of the complex number is based on an amount of the phase imbalance.

5. The device of claim 4, wherein the real output is added to the third multiplexer output.

6. The device of claim 5, wherein the group delay equalizer corrects for at least some of the group delay mismatch, and in which the real output is added to the third multiplexer output to correct for at least some of the phase imbalance.

7. The device of claim 2, wherein the group delay equalizer produces a linear group delay mismatch versus frequency response to approximately counteract a non-linear group delay mismatch versus frequency response.

8. A method of a quadrature receiver having an in-phase channel and a quadrature-phase channel, comprising the steps of:
determining an I/Q phase imbalance between digital signals of the in-phase channel and the digital signals of the quadrature-phase channel, the digital signals comprising samples;
calculating, by a group delay equalizer, from the phase imbalance, a group delay mismatch between the in-phase channel and the quadrature-phase channel, the group delay equalizer coupled to a quadrature-phase downsampling filter; and
delaying signals of one of the in-phase channel and the quadrature-phase channel by one or more samples, a number of samples being based upon an amount of the group delay mismatch, such that the group delay equalizer corrects for at least some of the group delay mismatch,
wherein the quadrature receiver includes a single-tap complex multiplier coupled to an output of the quadrature-phase downsampling filter, and the method includes, subsequent to the step of delaying, a step of multiplying imaginary signals of the quadrature-phase channel with a complex number $C_0$ having a value selected to reduce the I/Q phase imbalance, the single-tap complex multiplier having a real output and an imaginary output, and wherein the real output is added to real signals of the in-phase channel, and
wherein the complex number $C_0$ is computed determined as follows:
inject into the quadrature receiver an unmodulated test sinusoid at RF frequency so that $\pm f_{CAL}$ are resulting baseband frequencies,
measure amplitude and phase of the unmodulated test sinusoid of both the in-phase channel and the quadrature-phase channel relative to a common reference sinusoid by correlating the unmodulated test sinusoid with the common reference sinusoid,
perform a single-bin discrete Fourier transform both the in-phase channel and the quadrature-phase channel to produce two complex values, $I_{CAL}$ and $Q_{CAL}$, and compute $C_0 = \text{conjugate}\{-j * I_{CAL}/Q_{CAL}\}$.

9. The method of claim 8, wherein the step of determining the I/Q phase imbalance includes the steps of:
injecting into the quadrature receiver an unmodulated sinusoidal signal at a test radio frequency to produce a baseband signal at a negative calibration frequency and a baseband signal at a positive calibration frequency;
measuring, based on the in-phase channel, the phase of the baseband signal at the negative calibration frequency and the phase of the baseband signal at the positive calibration frequency; and
measuring, based on the quadrature-phase channel, the phase of the baseband signal at the negative calibration frequency and the phase of the baseband signal at the positive calibration frequency.

10. The method of claim 8, wherein the quadrature receiver receives a non-spread-spectrum digital radio frequency signal.

* * * * *

UNITED STATES PATENT AND TRADEMARK OFFICE
CERTIFICATE OF CORRECTION

| | | |
|---|---|---|
| PATENT NO. | : 8,135,094 B2 | Page 1 of 1 |
| APPLICATION NO. | : 12/199089 | |
| DATED | : March 13, 2012 | |
| INVENTOR(S) | : Robert Mark Gorday | |

It is certified that error appears in the above-identified patent and that said Letters Patent is hereby corrected as shown below:

Col. 12, in claim 8, line 20:

delete "determined".

Col. 12, in claim 8, line 31:

after "transform", insert --of--.

Signed and Sealed this
Twenty-fourth Day of April, 2012

David J. Kappos
*Director of the United States Patent and Trademark Office*